(12) United States Patent
Sato et al.

(10) Patent No.: US 9,268,869 B2
(45) Date of Patent: Feb. 23, 2016

(54) IMAGE PROCESSING APPARATUS THAT DISPLAYS ICON, METHOD OF CONTROLLING THE SAME, IMAGE PROCESSING SYSTEM, AND STORAGE MEDIUM

(71) Applicant: CANON KABUSHIKI KAISHA, Tokyo (JP)

(72) Inventors: Tomoya Sato, Kawasaki (JP); Toru Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 13/675,049

(22) Filed: Nov. 13, 2012

(65) Prior Publication Data

US 2013/0125054 A1 May 16, 2013

(30) Foreign Application Priority Data

Nov. 14, 2011 (JP) .................................. 2011-248728

(51) Int. Cl.
| | | |
|---|---|---|
| *G06F 3/0481* | (2013.01) | |
| *G06F 3/12* | (2006.01) | |
| *G06F 17/30* | (2006.01) | |
| *H04N 1/00* | (2006.01) | |

(52) U.S. Cl.
CPC ...... *G06F 17/30884* (2013.01); *H04N 1/00411* (2013.01); *H04N 1/00464* (2013.01); *H04N 1/00506* (2013.01); *G06F 3/1226* (2013.01); *G06F 3/1231* (2013.01)

(58) Field of Classification Search
CPC .......... H04N 1/00222; H04N 1/00225; H04N 1/00482; H04N 1/00413
See application file for complete search history.

(56) References Cited

U.S. PATENT DOCUMENTS

| | | | | |
|---|---|---|---|---|
| 7,187,884 B2* | 3/2007 | Bardolatzy et al. | ............. | 399/81 |
| 7,272,407 B2* | 9/2007 | Strittmatter et al. | .......... | 455/500 |
| 7,589,726 B2* | 9/2009 | Aholainen et al. | ............ | 345/440 |
| 7,853,732 B2* | 12/2010 | Kim et al. | ....................... | 710/19 |

(Continued)

FOREIGN PATENT DOCUMENTS

| | | |
|---|---|---|
| CN | 1988585 A | 6/2007 |
| CN | 102207836 A | 10/2011 |

(Continued)

OTHER PUBLICATIONS

Notice on the First Office Action dated Jan. 7, 2015 issued in corresponding CN201210462008.0. English translation provided.

(Continued)

*Primary Examiner* — Matt Kim
*Assistant Examiner* — Daniel Samwel
(74) *Attorney, Agent, or Firm* — Rossi, Kimms & McDowell LLP (57) ABSTRACT

An image processing apparatus which is capable of improving the visibility and operability of icons for a user. The image processing apparatus includes a console section. A button data import-processing section acquires location information of a server on a network. A server stores icon data indicating an icon to be displayed on a console section, for use in executing predetermined processing. When the location information is acquired, a communication section accesses the server indicated by the location information to thereby acquire icon data. The console section is caused to display the icon indicated by the acquired icon data.

13 Claims, 10 Drawing Sheets

(56) References Cited

U.S. PATENT DOCUMENTS

| | | | |
|---|---|---|---|
| 8,458,369 B2* | 6/2013 | Liao ................................. | 710/5 |
| 8,797,592 B2 | 8/2014 | Yagiura | |
| 2004/0090643 A1* | 5/2004 | Ochi ............................ | 358/1.13 |
| 2005/0193340 A1* | 9/2005 | Amburgey et al. ............ | 715/709 |
| 2006/0136420 A1* | 6/2006 | Gandhi et al. .................... | 707/9 |
| 2007/0159663 A1 | 7/2007 | Tsujimoto | |
| 2008/0276014 A1* | 11/2008 | Doi et al. ......................... | 710/15 |
| 2010/0031180 A1* | 2/2010 | Shin et al. ...................... | 715/771 |
| 2010/0138783 A1* | 6/2010 | Sawada et al. ................. | 715/808 |
| 2010/0161841 A1* | 6/2010 | Akagi et al. ..................... | 710/17 |
| 2011/0029878 A1 | 2/2011 | Matsumoto | |
| 2011/0153729 A1* | 6/2011 | Kawai et al. .................. | 709/203 |
| 2011/0242569 A1 | 10/2011 | Ohara | |

FOREIGN PATENT DOCUMENTS

| | | |
|---|---|---|
| JP | 2006-127503 A | 5/2006 |
| JP | 2010219698 A | 9/2010 |
| JP | 2011035714 A | 2/2011 |
| JP | 2011060240 A | 3/2011 |

OTHER PUBLICATIONS

Japanese Office Action issued in counterpart application No. JP2011-248728, dated Oct. 6, 2015.

\* cited by examiner

```
<html>
<head>
<title>service server</title>
<link rel="shortcut icon"href="http://service_server/favicon.ico">  ~601
</head>
<body>
...
</body>
</html>
```

IMAGE PROCESSING APPARATUS THAT DISPLAYS ICON, METHOD OF CONTROLLING THE SAME, IMAGE PROCESSING SYSTEM, AND STORAGE MEDIUM

BACKGROUND OF THE INVENTION

1. Field of the Invention

The present invention relates to an image processing apparatus, a method of controlling the image processing apparatus, an image processing system, and a storage medium, and more particularly to an image processing apparatus that display icons, a method of controlling the image processing apparatus, an image processing system, and a storage medium, 2. Description of the Related Art It is known that an information processing apparatus, such as a PC (personal computer), is connected to a web server on a network, and displays an operation screen provided by the web server on a web browser of the information processing apparatus.

In this case, the web browser of the information processing apparatus requests the web server to provide the operation screen, and in response to this request from the information processing apparatus, a web application on the web server transmits contents for causing the operation screen to be displayed on the web browser to the information processing apparatus. The contents comprise an HTML file, an image file, a script file, and so forth.

The web browser of the information processing apparatus analyzes the received contents, and displays the operation screen based on the description of the contents. Then, when a user inputs an instruction via the operation screen displayed on the web browser, the web browser notifies the input instruction to the web server. Upon receipt of the notification, the web application on the web server executes processing according to the input instruction.

Some of recent image processing apparatuses (multi-function peripherals) equipped with a scanner and a printer are provided with such a web browser as described above (see e.g. Japanese Patent Laid-Open Publication No. 2006-127503).

According to Japanese Patent Laid-Open Publication No. 2006-127503, first, a web server provides an operation screen for using the functions of an image processing apparatus. When a user inputs an instruction to the image processing apparatus via an operation screen displayed on the web browser of the image processing apparatus, the web browser sends the input instruction to the web server. The web server having received the instruction requests the image processing apparatus to execute associated processes according to the instruction input by the user. The image processing apparatus having received the request executes the requested processes.

The image processing apparatus of this type has its operation screen provided by a web server outside the image processing apparatus, and hence it is possible to easily change and customize the operation screen.

Some of such image processing apparatuses using an external web server, as described above, are capable of registering a shortcut button (web top button) of the web browser which is associated with an URL address of the web server.

When the web top button is selected, the web browser is displayed on the operation screen. The web browser accesses the web server of the URL registered in the web top button, and displays web screen contents of the URL. This is the same process as executed when a favorite is selected on a general browser.

Normally, a web top button has an icon displayed thereon. Since the web top button is registered as a shortcut to the web browser, normally, an icon for a web browser application is displayed.

In other words, even when different URL addresses have been registered in a plurality of web top buttons, respectively, the same icon is displayed on the web top buttons.

On the other hand, some information processing apparatuses, such as PCs, sometimes display icons acquired from web servers on respective web top buttons. In this case, the icons displayed on the web top buttons are acquired on a web server basis, and hence even when a plurality of web top buttons are displayed, the user can easily identify each web top button.

By applying such a method to the icons on the web top buttons of the image processing apparatus, it is possible to display respective different icons on the web top buttons.

Some of the image processing apparatuses of the above-described type have a function of exporting information on registered web top buttons as a file. By importing the exported file into another image processing apparatus, it is possible for the other image processing apparatus to use the same web top buttons as used in the image processing apparatus that has exported the file. This is the same method as employed in the normal web browser when favorite items are exported and imported.

However, when information on web top buttons is exported, in an image processing apparatus having the information imported, icons on the web top buttons become an icon for a web browser application. This is because the exported web top button data does not contain icon data to be displayed on the web top buttons.

In the image processing apparatus having imported the information on the web top buttons, when any of the web top buttons is depressed, the image processing apparatus accesses an associated web server to acquire an icon therefrom. It is not until this time that the display of the icon on the web top button is changed.

Therefore, when the information has been imported, even if different URL addresses have been registered in association with respective web top buttons, the same icon is displayed on the web top buttons, which brings about a problem that it is difficult for the user to identify the web top buttons from each other.

SUMMARY OF THE INVENTION

The present invention provides an image processing apparatus which is capable of improving the visibility and operability of icons for a user, a method of controlling the image processing apparatus, an image processing system, and a storage medium.

In a first aspect of the present invention, there is provided an image processing apparatus equipped with a display unit for displaying information, comprising a location information acquisition unit configured to acquire location information of a server on a network, the server storing icon data indicating an icon displayed on the display unit, for use in executing predetermined processing, an icon data acquisition unit configured to, when the location information is acquired by the location information acquisition unit, access the server indicated by the location information and thereby acquire the icon data, and a display control unit configured to cause the display unit to display the icon indicated by the icon data acquired by the icon data acquisition unit.

In a second aspect of the present invention, there is provided an image processing system including an image processing apparatus equipped with a display unit for displaying information, a server that stores icon data indicating an icon displayed on the display unit, for use in executing predetermined processing, and an information processing apparatus that stores location information of the server on a network, wherein the image processing apparatus comprises a location information acquisition unit configured to acquire the location information of the server on the network, an icon data acquisition unit configured to, when the location information is acquired by the location information acquisition unit, access the server indicated by the location information and thereby acquire the icon data, and a display control unit configured to cause the display unit to display the icon indicated by the icon data acquired by the icon data acquisition unit, and wherein the server comprises an icon data provision unit configured to provide the icon data to the image processing unit, and a location information provision unit configured to provide the location information to the image processing apparatus.

In a third aspect of the present invention, there is provided a method of controlling an image processing apparatus equipped with a display unit for displaying information, comprising acquiring location information of a server on a network, the server storing icon data indicating an icon displayed on the display unit, for use in executing predetermined processing, accessing, when the location information is acquired by the acquiring of the location information, the server indicated by the location information and thereby acquiring the icon data, and causing the display unit to display the icon indicated by the icon data acquired by the acquiring of the icon data.

In a fourth aspect of the present invention, there is provided a non-transitory computer-readable storage medium storing a computer-executable program for causing a computer to execute a method of controlling an image processing apparatus equipped with a display unit for displaying information, wherein the method comprises acquiring location information of a server on a network, the server storing icon data indicating an icon displayed on the display unit, for use in executing predetermined processing, accessing, when the location information is acquired by the acquiring of the location information, the server indicated by the location information and thereby acquiring the icon data, and causing the display unit to display the icon indicated by the icon data acquired by the acquiring of the icon data.

According to the present invention, it is possible to provide an image processing apparatus which is capable of improving the visibility and operability of icons for a user, a method of controlling the image processing apparatus, an image processing system, and a storage medium storing a program for executing the method.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
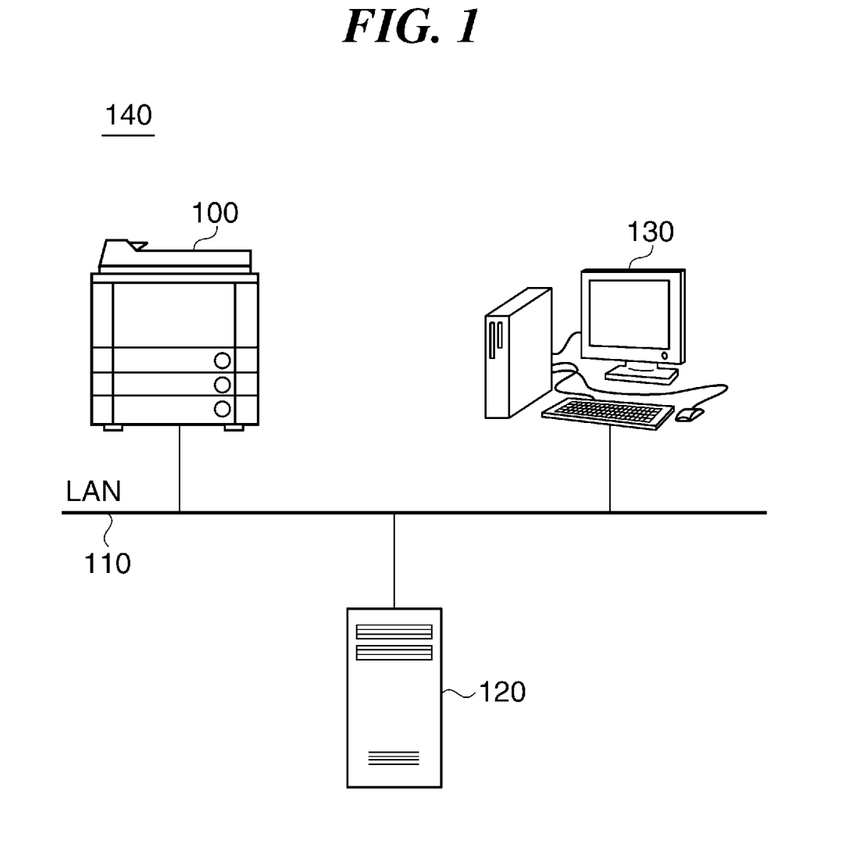
FIG. 1 is a diagram showing a general configuration of an image processing system including an image processing apparatus according to a first embodiment of the present invention.

FIG. 1 is a diagram showing a general configuration of an image processing system 140 including an image processing apparatus 100 according to a first embodiment of the present invention.

Referring to FIG. 1, in the image processing system 140, the image processing apparatus 100, a web server 120, and a PC (personal computer: information processing apparatus) 130 are communicably connected to each other via a LAN (local area network) 110. In the present embodiment, however, the number of apparatuses constituting the image processing system is not limited to the number of apparatuses in FIG. 1.

Further, although in the present embodiment, the LAN is employed as a connection method, this is not limitative. For example, it is also possible to employ a desired network, such as a WAN (public communication line), a serial transmission method, such as USB, and a parallel transmission method, such as Centronics or SCSI (small computer system interface).

Figure 2:
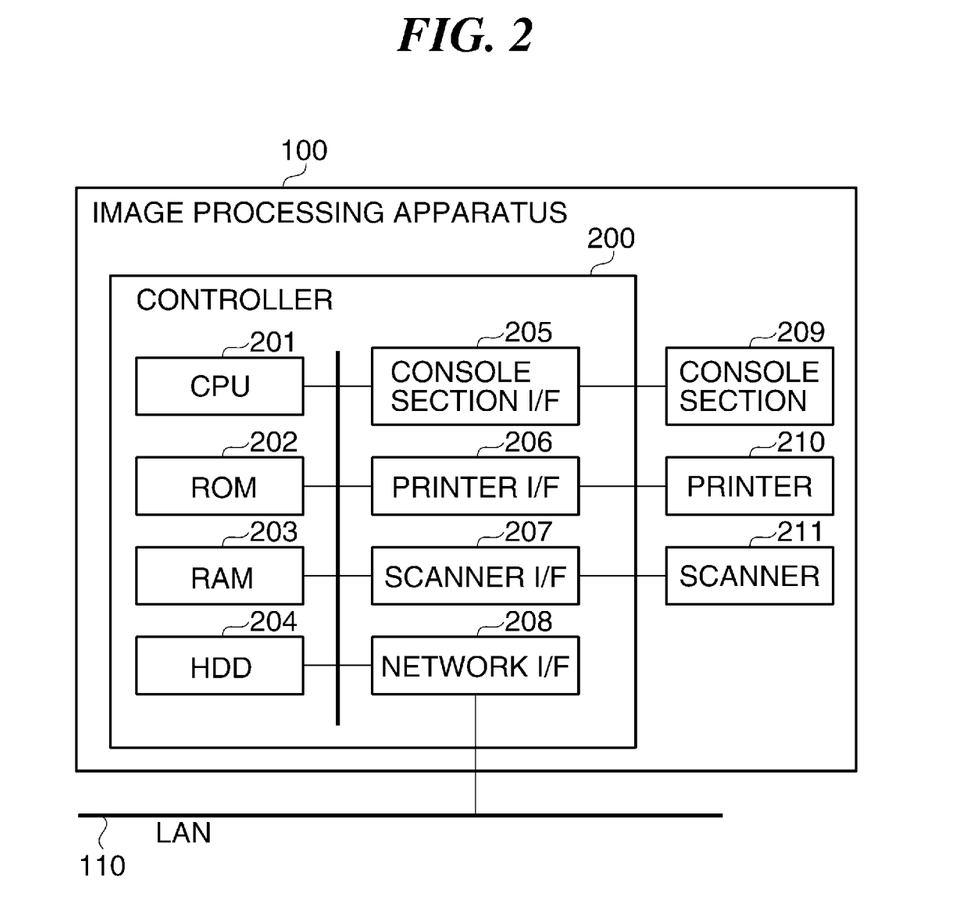
FIG. 2 is a block diagram of the image processing apparatus appearing in FIG. 1.

FIG. 2 is a block diagram of the image processing apparatus 100 appearing in FIG. 1.

As shown in FIG. 2, the image processing apparatus 100 comprises a controller 200, a console section 209, a printer 210, and a scanner 211.

The controller 200 controls the overall operation of the image processing apparatus 100. A CPU 201 reads out a control program stored in a ROM 202 and executes an associated one of various control processes, such as a read control process and a transmission control process. A RAM 203 is used as a main memory and a temporary storage area, such as a work area, of the CPU 201.

An HDD 204 stores image data, various programs, and various information tables. A console section interface 205 connects between the console section 209 and the controller 200. A printer interface 206 connects between the printer 210 and the controller 200. A scanner interface 207 connects between the scanner 211 and the controller 200.

A network interface 208 connects the controller 200 to the LAN 110. The network interface 208 transmits image data and information to an external apparatus on the LAN 110, and receives various information items and data therefrom.

The console section 209 is a display unit that displays information and includes a liquid crystal display section equipped with a touch panel function and a keyboard.

The controller 200 transfers mage data to be printed to the printer 210 via the printer interface 206, and the printer 210 prints an image represented by the transferred image data on a recording medium.

The scanner 211 generates image data by reading an image from an original, and inputs the image data to the controller 200 via the scanner interface 207.

Figure 3:
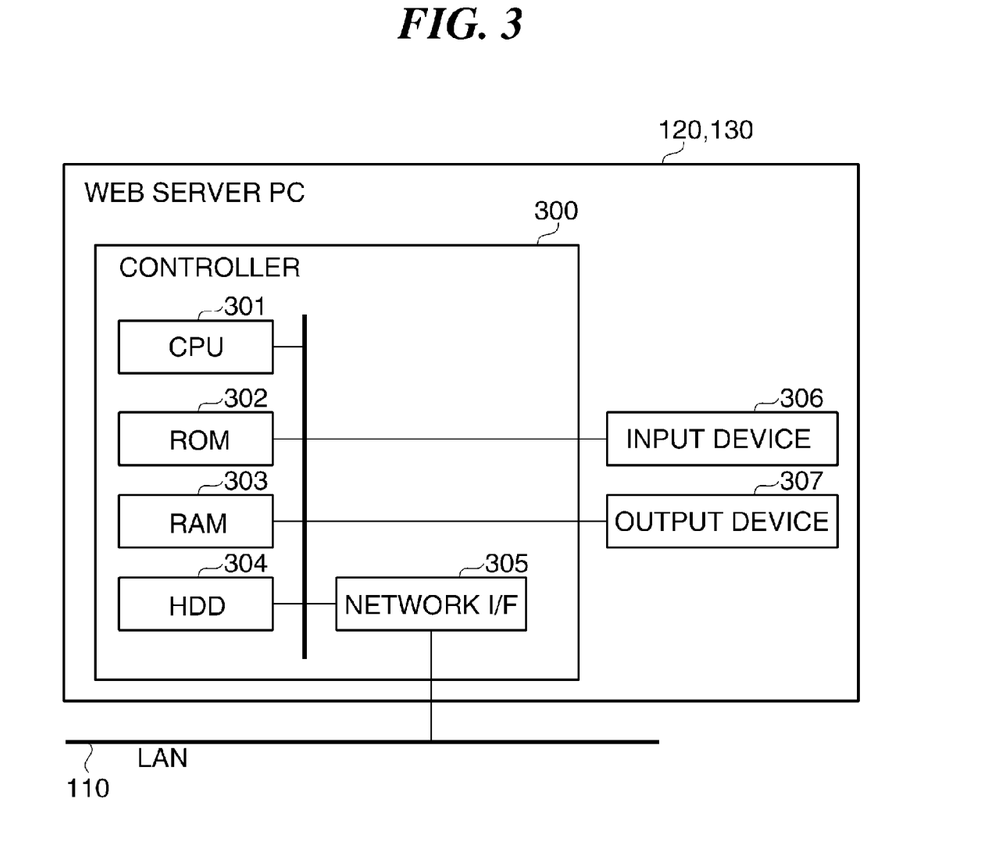
FIG. 3 is a block diagram showing the configuration of each of a web server and a PC appearing in FIG. 1.

FIG. 3 is a block diagram showing the configuration of each of the web server 120 and the PC 130 appearing in FIG. 1.

The web server 120 and the PC 130 have the same hardware configuration, and hence the configuration is collectively described, by referring to them as the web server 120 (/PC 130).

As shown in FIG. 3, the web server 120 (/PC 130) comprises a controller 300, an input device 306, and an output device 307.

The controller 300 controls the overall operation of the web server 120 (/PC 130). A CPU 301 reads out a control program stored in a ROM 302 and executes an associated one of various control processes. A RAM 303 is used as a main memory and a temporary storage area, such as a work area, of the CPU 301. An HDD 304 stores image data, various programs, and icon data, referred to hereinafter.

A network interface 305 connects the controller 300 to the LAN 110. This network interface 305 transmits and receives various information items and data to and from other apparatuses on the LAN 110.

The input device 306 comprises a keyboard and a pointing device, and transmits inputs from a user to the CPU 301. The output device 307 comprises a display device, such as a CRT (cathode ray tube).

Figure 4:
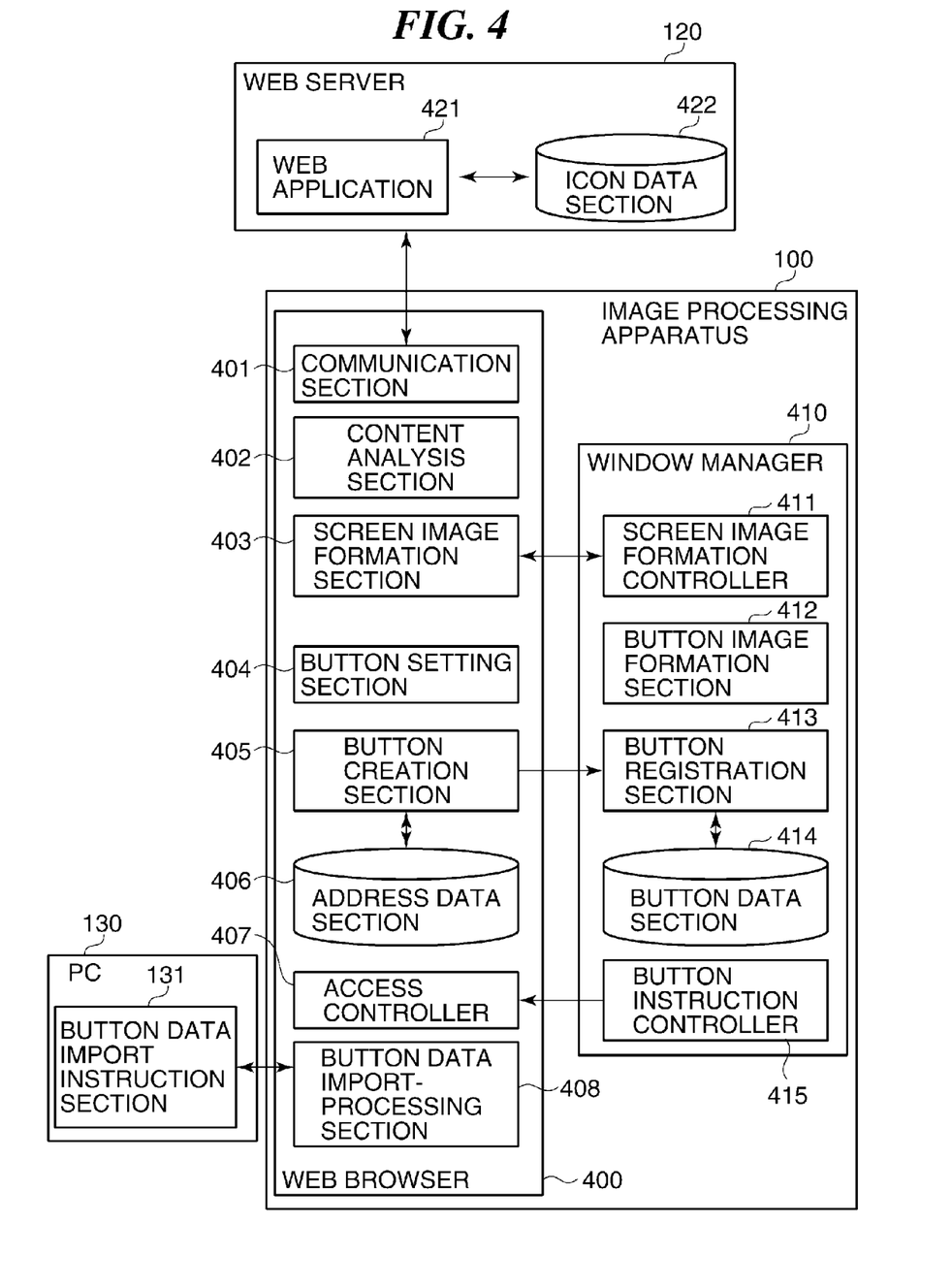
FIG. 4 is a block diagram of the software configuration of the whole system including the image processing apparatus, the web server, and the PC in FIG. 1.

FIG. 4 is a block diagram of the software configuration of the whole system including the image processing apparatus 100, the web server 120, and the PC 130 in FIG. 1.

Software blocks shown in FIG. 4 are realized by control programs stored in the ROM 202 or the HDD 204, which are read out and executed by the CPU 201 of the image processing apparatus 100. Further, the other software blocks shown in FIG. 4 are realized by control programs stored in the ROM 302 or the HDD 304 of each of the web server 120 and the PC 130, which are reads out and executed by the CPU 301 of the same.

The image processing apparatus 100 is equipped with the functions of a web browser 400 and a window manager 410.

The web browser 400 communicates with the web server 120, requests screen information to be displayed thereon from the web server 120, and displays the screen information on the console section 209. Further, the web browser 400 transmits a request to the web server 120 based on a user instruction input via the console section 209.

The web browser 400 comprises a communication section 401, a content analysis section 402, a screen image formation section 403, a button setting section 404, a button creation section 405, an address data section 406, an access controller 407, and a button data import-processing section 408.

The communication section 401 communicates with the web server 120 in order to use a web application 421 of the web server 120. Specifically, the communication section 401 transmits a request for acquiring contents to the web application 421, and acquires a response transmitted from the web application 421 as the contents. Further, the communication section 401 requests an icon from the web application 421, and acquires the icon transmitted from the web application 421.

The content analysis section 402 analyzes the contents acquired by the communication section 401, and creates a screen for displaying the contents on the console section 209.

The screen image formation section 403 displays the screen created by the content analysis section 402 on the console section 209. Specifically, in a case where an image forming instruction is received from a screen image formation controller 411 of the window manager 410, the screen image formation section 403 forms a screen image on the console section 209.

The button setting section 404 requests the button creation section 405 to create a button for displaying the web application 421 on the console section 209. At this time, the button setting section 404 designates a title to be displayed on the button and an access URL of the web application 421.

The button creation section 405 requests the window manager 410 to register a display button for use in using the web application 421. After requesting the registration of the display button, the button creation section 405 receives an ID (identifier) of the registered display button from the window manager 410, and stores the ID in the address data section 406, in association with the address (access URL) of the web application 421.

Further, the button creation section 405 stores the icon received by the communication section 401 in the address data section 406, in association with the address (access URL) of the web application 421.

The address data section 406 is a storage area provided in the RAM 203 or the HDD 204.

The access controller 407 is notified by the window manager 410 that a button registered by the button creation section 405 is selected by the user. In response to the notification, the access controller 407 reads out the address of the web application 421 associated with the ID of the registered button received by this notification, from the address data section 406, and instructs the communication section 401 to make a request to an address (access URL) registered in association with the button.

The button data import-processing section 408 communicates with the PC 130 and receives a button data import request from the PC 130. Then, the button data import-processing section 408 requests the button setting section 404 to create buttons based on the received button data.

The window manager 410 comprises the screen image formation controller 411, a button image formation section 412, a button registration section 413, a button data section 414, and a button instruction controller 415.

In response to an instruction from the button instruction controller 415, the screen image formation controller 411 switches the screen displayed on the console section 209 to a screen of an application registered in association with the selected button. Specifically, the screen image formation controller 411 issues an image forming request to the application registered in association with the selected button.

The button image formation section 412 forms images of respective registered buttons on a button display screen displayed by the window manager 410.

The button registration section 413 receives a request from the button creation section 405 and registers the display button for the web application 421 using the web browser 400. In doing this, the button registration section 413 issues the ID of the display button, and notifies the button creation section 405 of the ID. The types and IDs of applications registered in association with respective buttons are stored in the button data section 414.

The button data section 414 is a storage area provided in the RAM 203 or the HDD 204.

In a case where a user instruction input from the console section 209 is for selecting one of the registered buttons, the button instruction controller 415 sends a notification to an application registered in association with the selected button. If the button selected by the user is the registered button for the web application 421, the button instruction controller 415 notifies the access controller 407 of the ID of the selected registered button.

The web server 120 comprises the web application 421 and an icon data section 422. Hereinafter, in the present embodiment, icon data is sometimes simply referred to as an "icon". Further, a displayed icon is sometimes referred to as a "button".

The web application 421 receives a request message from the communication section 401, and transmits a response message for providing a service thereof to the communication section 401.

Further, upon receipt of a request for the icon from the communication section 401, the web application 421 acquires the icon from the icon data section 422, and transmits the icon to the communication section 401.

The icon data section 422 is a storage area provided in the RAM 303 or the HDD 304. Note that a single web server 120 may include a plurality of web applications 421 and icon data sections 422. Further, a plurality of web servers may form a single web application.

The PC 130 includes a button data import instruction section 131. Upon receipt of an instruction from the user, the button data import instruction section 131 requests the image processing apparatus 100 to import button data.

The above-described button data import instruction section 131 may be a dedicated application or a web browser for accessing a button data-importing web application provided by the image processing apparatus 100.

Note that such a button as is configured to be displayed on the web browser 400 and, when selected, cause the web browser 400 to request the web application 421 to send a screen, is referred to as a "web top button", for convenience of explanation.

Figure 5:
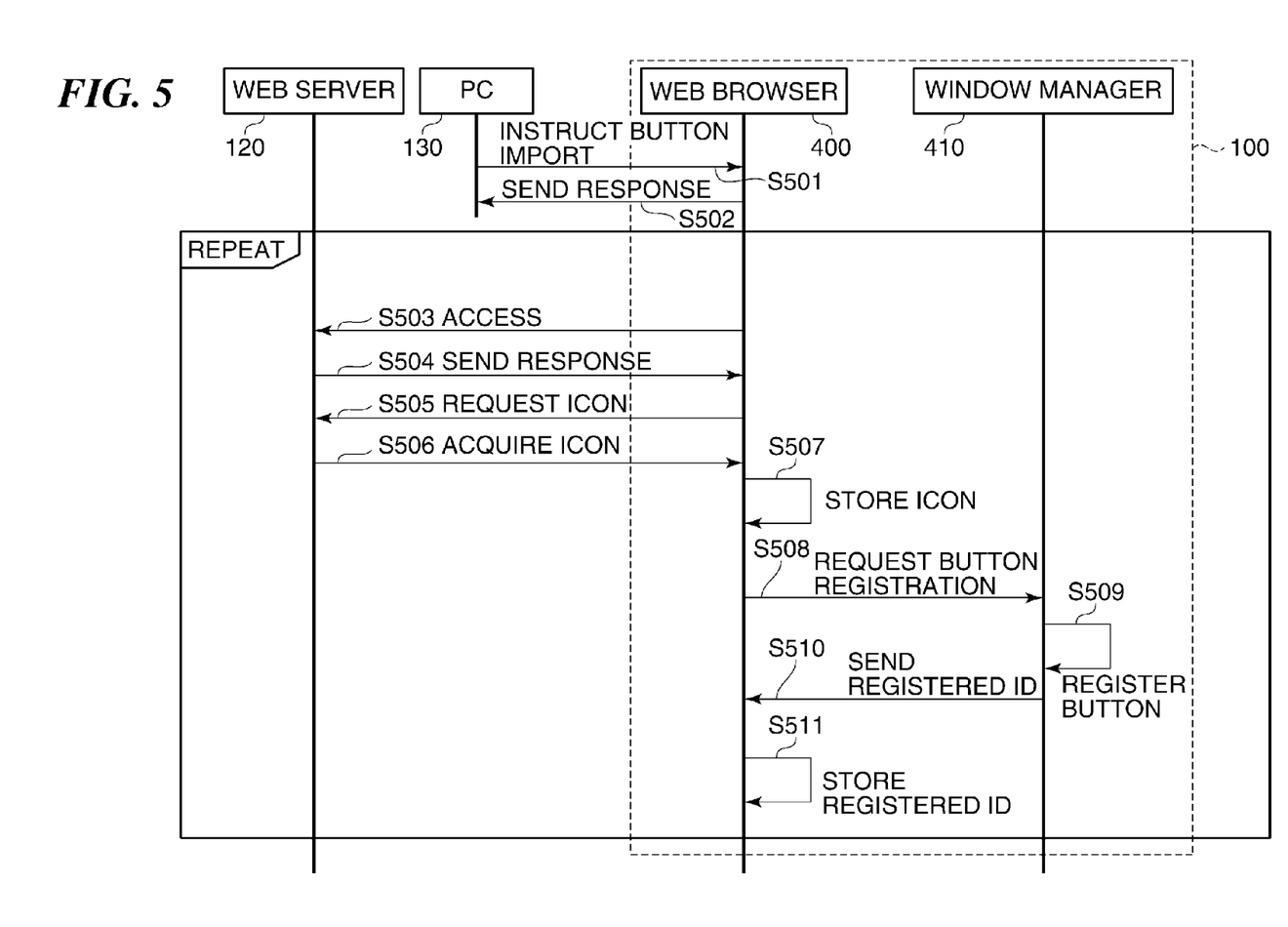
FIG. 5 is a sequence diagram useful in explaining a series of processes executed in the image processing system shown in FIG. 1, for importing button data.

FIG. 5 is a sequence diagram useful in explaining a series of processes executed in the image processing system 140 shown in FIG. 1, for importing button data.

Operations shown in the sequence diagram in FIG. 5 are realized by the CPU 201 of the image processing apparatus 100 and the CPU 301 of each of the web server 120 and the PC 130 which execute respective associated control programs.

Referring to FIG. 5, the PC 130 operated by the user instructs the web browser 400 of the image processing apparatus 100 to import button data and sends the import data to the image processing apparatus 100 (step S501). Note that in the import data instructed to be imported, there are described combinations of the titles and access URLs of a plurality of web applications to be registered as buttons. Further, any suitable description format may be employed insofar as it is determined in advance for use between the image processing apparatus 100 and the PC 130.

Note that the user of the PC 130 causes button data to be exported in advance from an image processing apparatus other than the image processing apparatus 100 and use the button data as the import data. Further, data of favorites in a general web browser installed on a PC or the like may be used as the import data.

Then, the button data import-processing section 408 of the web browser 400 receives the import data from the PC 130, and sends a response to the PC 130 (step S502).

Next, the following steps S503 to S511 are repeatedly executed as many times as the number of button data items contained in the received import data.

First, the web browser 400 accesses the web server 120 based on the access URL of one of the button data items in the import data (step S503). Specifically, the communication section 401 of the web browser 400 sends a GET request to the designated URL.

Then, the web application 421 of the web server 120 sends a response message to the communication section 401 of the web browser 400 (step S504). At this time, the web application 421 describes location information of an icon held by the web application 421, in the response message. This step S504 corresponds to a location information provision unit configured to provide location information to the image processing apparatus.

To describe the location information, any suitable format may be employed insofar as it is determined in advance for use between the image processing apparatus 100 and the web application 421. For example, the location information may be described according to a format called "favicon" for use in the HTML/XHTML.

Figure 6:
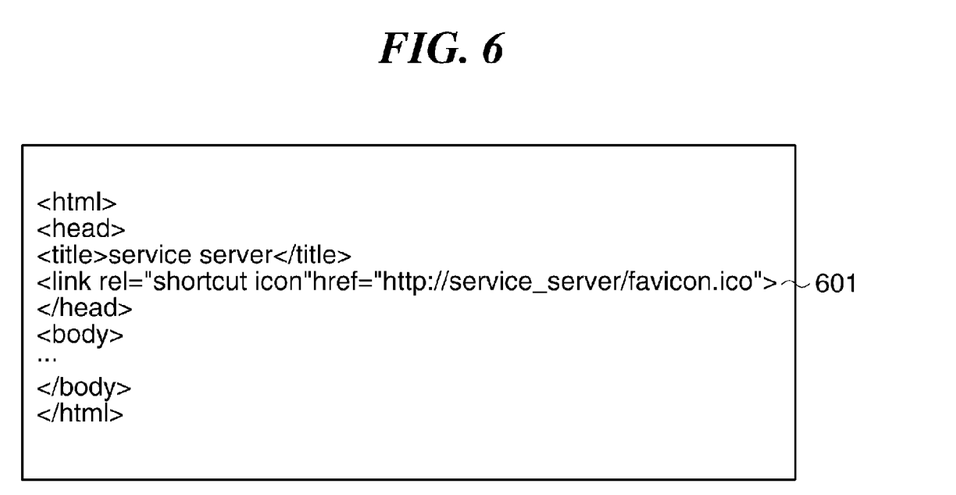
FIG. 6 is a view showing an example of location information of an icon, which is described according to a description format of "favicon".

FIG. 6 is a view showing an example of the location information of the icon, which is described according to the description format of "favicon".

In the example 601, [<link rel="shortcut icon" href="http://service_server/favicon.ico">] indicates the location information of the icon. As described above, the location information is information on a server on a network, which stores icon data indicative of an icon for executing predetermined processing displayed on the console section 209. Further, the predetermined processing is e.g. processing for accessing an address (URL) indicated by the icon.

Referring again to the sequence diagram, the communication section 401 of the web browser 400 sends a request for acquiring the icon to an address described in the location information of the icon acquired in the step S504 (step S505). Specifically, since the icon per se is stored in the icon data section 422 of the web server 120, the communication section 401 sends a GET request to the web server 120.

Next, the web application 421 of the web server 120 transmits the requested icon to the communication section 401 of the web browser 400, whereby the web browser 400 acquires the icon (step S506). This step S506 corresponds to an icon data provision unit configured to provide icon data to the image processing apparatus.

The button creation section 405 of the web browser 400 stores the icon acquired in the step S506 in the HDD 204, and stores location information of the stored icon in the address data section 406 (step S507).

The button creation section 405 of the web browser 400 requests the button registration section 413 of the window manager 410 to register a button based on the button data received in the step S501 (step S508).

At this time, the button creation section 405 designates the title of the button indicated by the button data received in the step S501 and the location of the address data section 406 storing the location information of the icon, to the button registration section 413.

Next, the button registration section 413 of the window manager 410 registers the requested button in the step S508 (step S509). The button registration section 413 generates an ID of the registered button, and stores the ID in the button data section 414 in association with the title of the button and the location information of the icon stored in the icon data section 422. Further, the button image formation section 412 of the window manager 410 displays the registered button on the screen.

Then, the button registration section 413 of the window manager 410 sends the registered ID of the button generated in the step S509 to the button creation section 405 of the web browser 400 (step S510).

The button creation section 405 of the web browser 400 stores the ID of the registered button acquired from the button registration section 413 in the address data section 406 together with the address (access URL) of the web application 421 (step S511).

The above-described steps S503 to S511 are repeatedly executed as many times as the number of button data items contained in the import data in the step S501.

Figure 7:
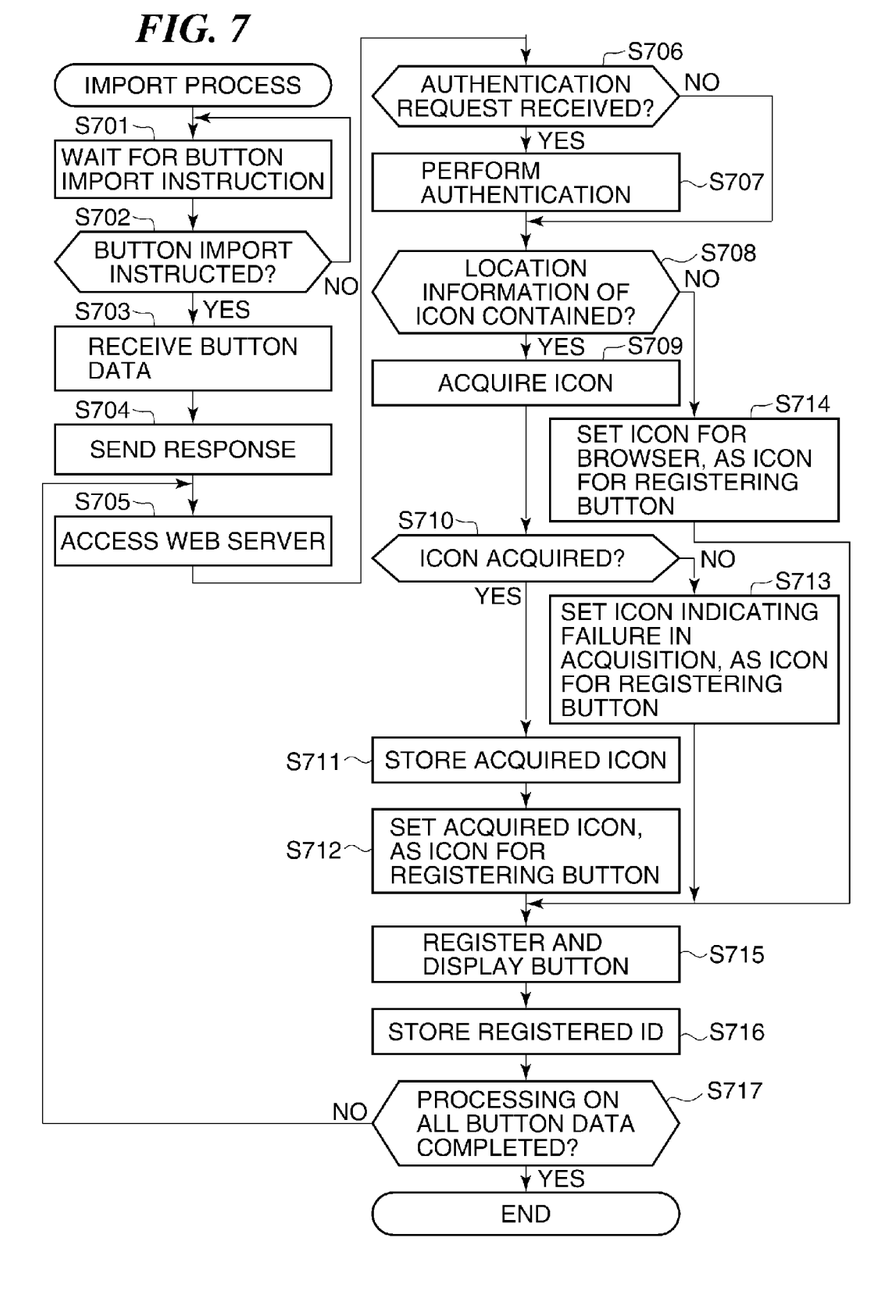
FIG. 7 is a flowchart of an import process executed by the image processing apparatus appearing in FIG. 1.

FIG. 7 is a flowchart of an import process executed by the image processing apparatus 100 in FIG. 1.

Operations of respective steps of the import process shown in FIG. 7 are realized by the CPU 201 of the image processing apparatus 100 which executes associated control programs.

Referring to FIG. 7, the button data import-processing section 408 of the web browser 400 waits for a button import instruction from the PC 130 (step S701).

The button data import-processing section 408 of the web browser 400 determines whether or not an import instruction has been received from the PC 130 (step S702). If it is determined in the step S702 that an import instruction has not been received from the PC 130 (NO to the step S702), the button data import-processing section 408 returns to the step S701.

On the other hand, if it is determined in the step S702 that an import instruction has been received from the PC 130 (YES to the step S702), the button data import-processing section 408 receives import data from the PC 130 (step S703) (location information acquisition unit), and sends a response to the PC 130 (step S704). The received import data is temporarily stored in the RAM 203 or the HDD 204.

Then, the following steps S705 to S717 are repeatedly executed as many times as the number of button data items contained in the received import data.

First, the button data import-processing section 408 accesses a web server indicated by the access URL of a web application indicated by the import data (step S705). Specifically, the communication section 401 of the web browser 400 accesses the web server indicated by the designated URL.

The communication section 401 sends a GET request to the above web server, and acquires a response to the request. At this time, it is determined whether or not the communication section 401 has received an authentication request from the web application of the web server (step S706).

Specifically, it is determined whether or not the response acquired in the step S705 indicates an authentication request.

If it is determined in the step S706 that the communication section 401 has not received an authentication request from the web application of the web server (NO to the step S706), the process proceeds to the step S708. On the other hand, if it is determined in the step S706 that the communication section 401 has received an authentication request from the web application of the web server (YES to the step S706), authentication processing is performed (step S707), and then the process proceeds to the step S708. The step S706 corresponds to an authentication unit configured to perform authentication so as to access the web server.

Figure 8:
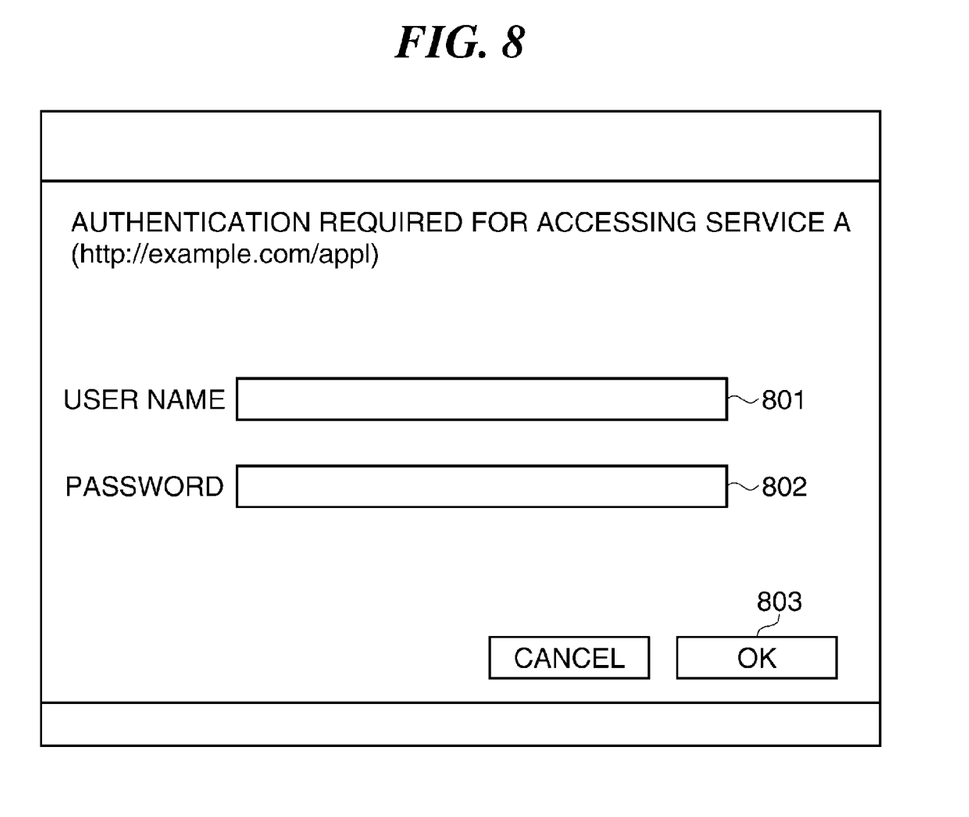
FIG. 8 is a view showing an example of an authentication screen displayed on a console section of the image processing apparatus.

FIG. 8 is a view showing an example of an authentication screen displayed on the console section 209 of the image processing apparatus 100.

An area 801 is for inputting a user name used for accessing a service A which is provided by one of the web applications. An area 802 is for inputting a password associated with the user name input to the area 801.

When the user selects the area 801 or the area 802, a soft keyboard screen is displayed on the console section 209 (not shown), for receiving an input from the user. When an OK button 803 is depressed, the communication section 401 of the web browser 400 sends the input user name and password to the web application, whereby authentication processing is performed. Note that information on a user name and a password used for authentication may be input by the user on an input screen as shown in FIG. 8 during the import process, or may be input in advance to the image processing apparatus 100 such that the information is used during authentication.

Referring again to FIG. 7, the content analysis section 402 of the web browser 400 determines whether or not web contents received as the response include the location information of the icon (step S708).

Specifically, the content analysis section 402 determines whether or not the web contents include the description of the "favicon" explained in the step S504 in FIG. 5. If it is determined in the step S708 that the web contents received as the response include the location information of the icon (YES to the step S708), the communication section 401 acquires the icon based on the location information of the icon (step S709). This step S709 corresponds to an icon data acquisition unit configured to, when location information is acquired, access a server indicated by location information and acquire icon data.

Specifically, the communication section 401 transmits a request for acquiring the icon to a URL indicated by the location information of the icon, and acquires the icon as a response to the request.

Next, it is determined whether or not the icon could be acquired (step S710). If it is determined in the step S710 that the icon could be acquired (YES to the step S710), the acquired icon is stored (step S711). Specifically, the button creation section 405 of the web browser 400 stores the acquired icon in the HDD 204, and stores location information of the stored icon in the address data section 406.

Then, the acquired icon is set as an icon for use in registration of a button (step S712), and the process proceeds to a step S715.

If it is determined in the step S708 that the web contents received as the response do not include the location information of the icon (NO to the step S708), a default icon for the web browser 400, indicating that no icon is designated, is set as an icon for use in registration of a button (step S714), and the process proceeds to the step S715.

If it is determined in the above-described step S710 that the icon could not be acquired (NO to the step S710), an icon indicating that the icon could not be acquired is set as an icon for use in registration of a button (step S713), and the process proceeds to the step S715.

Next, a process for registering and displaying the button is performed using an icon set as the icon for use in registration of the button, in one of the steps S712, S713 and S714 (step S715). This step S715 corresponds to a display control unit configured to cause the console section to display an icon indicated by the acquired icon data.

When it is determined in the step S708 that the location information has not been acquired and the default icon for the web browser 400, indicating that no icon is designated, is set as the icon for use in registration of a button in the step S714, in the step S715, the console section 209 is caused to display the icon (default icon) determined in advance.

When it is determined in the step S710 that the icon data could not be acquired and the icon indicating that the icon could not be acquired is set as the icon for use in registration of the button in the step S713, in the step S715, the console section 209 is controlled to display the icon indicating that the icon data could not be acquired.

Specifically, the button creation section 405 of the web browser 400 requests the button registration section 413 of the window manager 410 to register the button set in the step S712, S713 or S714.

The button registration section 413 generates an ID of the button. Then, the button image formation section 412 displays the registered icon on the console section 209.

Then, the button registration section 413 of the window manager 410 sends the ID generated in the step S715 to the button creation section 405 of the web browser 400. The button creation section 405 stores the ID of the button received from the button registration section 413 in the address data section 406 in association with the access URL of the web application (step S716).

Next, it is determined whether or not the processing has been completed on all the button data items (step S717). If it is determined in the step S717 that the processing has not been completed on all the button data items (NO to the step S717), the process returns to the step S705, whereas if it is determined in the step S717 that the processing has been completed on all the button data items (YES to the step S717), the present process is terminated.

According to the import process in FIG. 7, when the location information is acquired, a server indicated by the location information is accessed, icon data is acquired, and the display unit is caused to display an icon indicated by the acquired icon data, whereby the icon is made identifiable. This makes it possible to improve the visibility and operability of the icon for the user.

Figure 9:
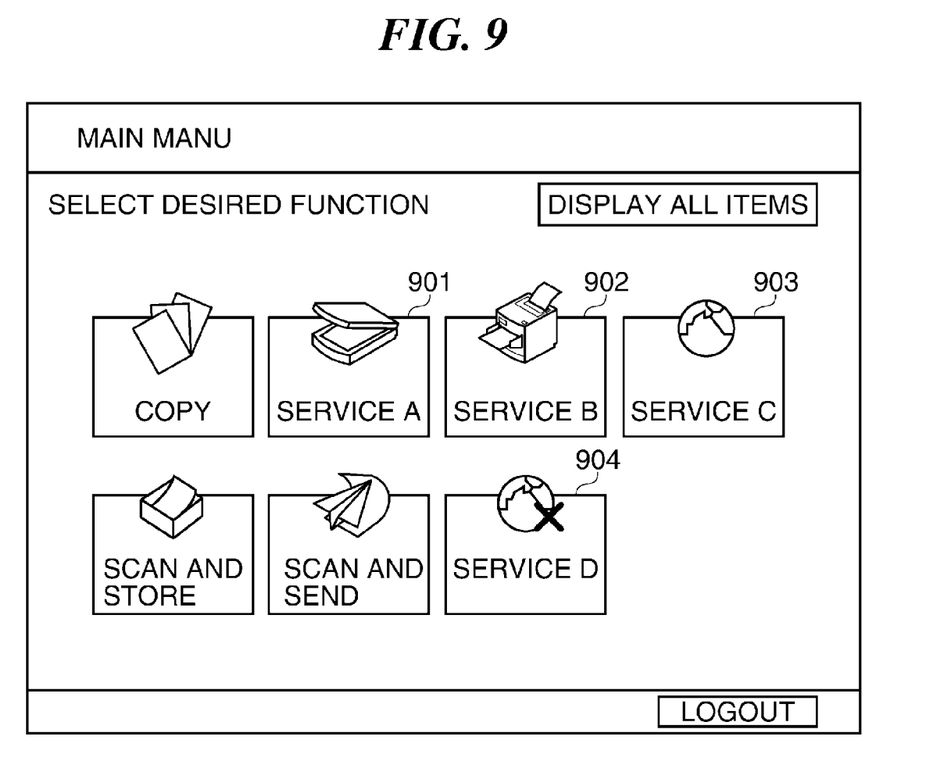
FIG. 9 is a view showing an example of an operation screen displayed on the console section by the import process in FIG. 7.

FIG. 9 is a view showing an example of an operation screen displayed on the console section 209 by the import process in FIG. 7.

Buttons 901, 902, 903, and 904 are web top buttons for a web application A that provides a service A, a web application B that provides a service B, a web application C that provides a service C, and a web application D that provides a service D, respectively.

In the case of the illustrated example, as for the web application A and the web application B, icons were designated and could be acquired, and hence icons associated with the respective web applications are displayed.

On the other hand, as for the web application C, no icon was designated, so that there is displayed a default icon, such as the button 903, of the browser, indicating that no icon was designated.

Further, as for the web application D, an icon was designated but it could not be acquired, so that there is displayed an icon, such as the button 904, indicating that the icon could not be acquired.

As described above, in the first embodiment, upon receipt of a button import instruction for importing a web top button, the URL of a web application to be registered as the web top button is accessed to acquire an icon of the web application, and a button is created and displayed using the acquired icon.

As a consequence, for a plurality of web top buttons, different icons designated by web applications registered can be displayed, respectively, which makes it possible to easily identify the web top buttons.

Note that although in the above-described embodiment, a button import instruction is received from the PC 130, this is not limitative, but a request for importing button data may be directly received from an image processing apparatus which is different from the image processing apparatus 100 and has the button data.

This makes it possible to periodically synthesize web top buttons of a plurality of image processing apparatuses. In this case as well, each image processing apparatus having received button import instructions can display different icons designated by web applications registered for the web top buttons, which makes it possible to easily identify the web buttons.

Next, a second embodiment of the present invention will be described. The configurations of an image processing system, an image processing apparatus, a web server, and a PC, according to the second embodiment, are the same as those in the first embodiment.

In the second embodiment, processing is not started when a request for importing web top buttons is received, but a button for instructing all icons to be acquired is displayed on a menu screen, and when the button is depressed by the user, icon acquisition is executed.

Figure 10:
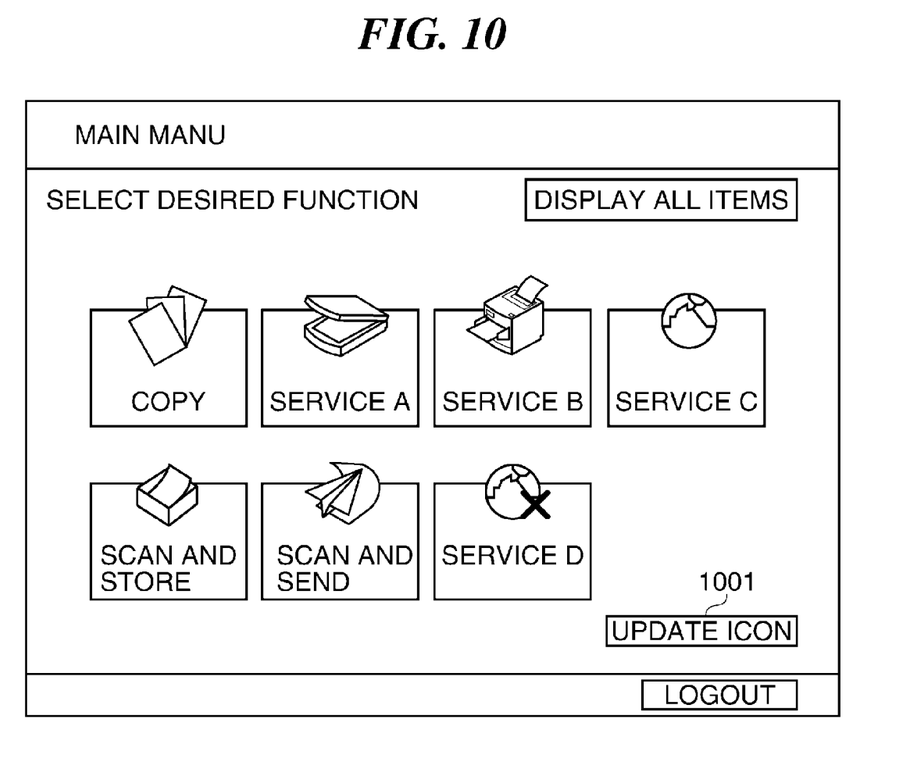
FIG. 10 is a view showing an example of an operation screen displayed on a console section of an image processing apparatus according to a second embodiment of the invention.

FIG. 10 is a view showing an example of an operation screen displayed on a console section 209 according to the second embodiment.

The example of the operation screen shown in FIG. 10 is distinguished from the FIG. 9 example in that it has an icon update button 1001 added thereto.

In the second embodiment, when the icon update button 1001 is depressed, the step S705 et seq. in FIG. 7 are performed. The icon update button 1001 corresponds to an update unit configured to cause icon data to be acquired to update an icon when location information of the icon has been already acquired.

According to the second embodiment, an icon for every web top button can be updated in desired timing not depending on timing in which an instruction for importing the web top button is received.

For example, in a case where there is an icon of which acquisition has failed in timing at which a button import instruction has been received, there is a possibility that the icon is successfully acquired by the user executing icon update in desired timing. Note that the above-mentioned icon of which acquisition has failed is an icon for a web application D that provides a service D in FIG. 10, for example.

Further, when an icon update is executed on an web application, it is possible to promptly cause the updated icon to be reflected on an icon on an associated one of the web top buttons.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-248728 filed Nov. 14, 2011, which is hereby incorporated by reference herein in its entirety.

What is claimed is:

1. An image processing apparatus comprising:
a display unit;
at least one processor; and
at least one memory comprising computer code, the at least one memory and the computer code configured to, with the at least one processor, cause the image processing apparatus to:
receive import data for a shortcut button for obtaining a web content from an information processing apparatus, the import data including a URL and a title of the shortcut button;
access a server on a network indicated by the URL in accordance with receiving of the import data, and thereby obtain an icon for the shortcut button from the server, the server being different from the information processing apparatus; and
display the obtained icon on the display unit with the title of the shortcut button.

2. The image processing apparatus according to claim 1, wherein the at least one memory and the computer code are further configured to, with the at least one processor, cause the image processing apparatus to display a predetermined icon on the display unit in a case that the icon has not been obtained.

3. The image processing apparatus according to claim 1, wherein the at least one memory and the computer code are further configured to, with the at least one processor, cause the image processing apparatus to display an icon on the display unit indicating that the icon could not be obtained.

4. The image processing apparatus according to claim 1, wherein the at least one memory and the computer code are further configured to, with the at least one processor, cause the image processing apparatus to:
display an icon update button together with the icon; and
access the server again when the icon update button is depressed and update the icon in a case where a new icon is obtained from the server.

5. The image processing apparatus according to claim 1, wherein the at least one memory and the computer code are further configured to, with the at least one processor, cause the image processing apparatus to perform authentication for accessing the server.

6. The image processing apparatus according to claim 1, wherein in a case where import data including a plurality of URLs is received from the information processing apparatus, access processing is repeatedly performed as many times as the number of the URLs contained in the import data.

7. The image processing apparatus according to claim 1, wherein the at least one memory and the computer code are further configured to, with the at least one processor, cause the image processing apparatus to:
obtain, in response to specifying of the displayed icon, web contents based on the URL corresponding to the specified icon and display the obtained web contents.

8. The image processing apparatus according to claim 1, wherein the at least one memory and the computer code are further configured to, with the at least one processor, cause the image processing apparatus to:
obtain the web contents from the server by accessing the server indicated by the URL contained in the received import data; and
determine whether or not the obtained web contents include location information of the icon in the received web contents.

9. The image processing apparatus according to claim 1, wherein the obtained icon is displayed in a function selection screen.

10. The image processing apparatus according to claim 1, wherein the web contents corresponding to the URL is not displayed when obtaining the icon.

11. An image processing system including an image processing apparatus, a server, and an information processing apparatus,
wherein the image processing apparatus comprises:
a display unit;
at least one processor; and
at least one memory comprising computer code, the at least one memory and the computer code configured to, with the at least one processor, cause the image processing apparatus to:
receive import data for a shortcut button for obtaining a web content from the information processing apparatus, the import data including a URL and a title of the shortcut button;
access the server on a network indicated by the URL in accordance with receiving of the import data, and thereby obtain an icon for the shortcut button from the server, the server being different from the information processing apparatus; and
display the obtained icon on the display unit with the title of the shortcut button.

12. A method of displaying information using an image processing apparatus equipped with a display unit, the method comprising:
receiving import data for a shortcut button for obtaining a web content from an information processing apparatus, the import data including a URL and a title of the shortcut button;
accessing a server on a network indicated by the URL in accordance with receiving of the import data, and thereby obtain an icon for the shortcut button from the server, the server being different from the information processing apparatus; and
displaying the obtained icon on the display unit with the title of the shortcut button.

13. A non-transitory computer-readable storage medium storing a computer-executable program for causing a computer to execute a method of displaying information using an image processing apparatus equipped with a display unit, the method comprising:
receiving import data for a shortcut button from an information processing apparatus, the import data including a URL and a title of the shortcut button;
accessing a server on a network indicated by the URL in accordance with receiving of the import data, and thereby obtain an icon for the shortcut button from the server, the server being different from the information processing apparatus; and
displaying the obtained icon on the display unit with the title of the shortcut button.

* * * * *